(12) United States Patent
Keller

(10) Patent No.: US 7,554,436 B2
(45) Date of Patent: Jun. 30, 2009

(54) SELF-CONTAINED TURN SIGNAL INDICATOR UNIT

(76) Inventor: Lucius W. Keller, 1421 Genoa Dr., Vista, CA (US) 92081

( * ) Notice: Subject to any disclaimer, the term of this patent is extended or adjusted under 35 U.S.C. 154(b) by 0 days.

(21) Appl. No.: 12/288,042

(22) Filed: Oct. 16, 2008

(65) Prior Publication Data

US 2009/0045934 A1 Feb. 19, 2009

(51) Int. Cl.
*B60Q 1/26* (2006.01)
*B60Q 1/34* (2006.01)
*H01H 3/16* (2006.01)
*G05G 1/00* (2006.01)

(52) U.S. Cl. .............. 340/474; 340/475; 340/384.4; 340/384.5; 340/693.5; 200/61.27; 200/61.54; 74/469; 74/491

(58) Field of Classification Search .................. None
See application file for complete search history.

(56) References Cited

U.S. PATENT DOCUMENTS

| 3,343,123 | A | 9/1967 | Troesh |
| 5,099,222 | A | 3/1992 | Campagna |
| 5,218,340 | A | 6/1993 | Shannon, Jr. et al. |
| 5,309,143 | A | 5/1994 | Brown et al. |
| 5,455,558 | A | 10/1995 | Gregory |
| 6,424,255 | B1 * | 7/2002 | Shanahan .................. 340/457 |
| 6,426,695 | B2 * | 7/2002 | Pagano et al. ............... 340/475 |
| 6,933,838 | B2 * | 8/2005 | Yamaki et al. .............. 340/475 |
| 2005/0017861 | A1 | 1/2005 | Hunter |
| 2006/0164226 | A1 | 7/2006 | Hartle |
| 2006/0220823 | A1 * | 10/2006 | Armstrong et al. .......... 340/468 |
| 2008/0129481 | A1 | 6/2008 | Zumbrunnen et al. |
| 2008/0136617 | A1 * | 6/2008 | White et al. ................. 340/474 |
| 2008/0140240 | A1 * | 6/2008 | White et al. .................. 700/94 |

\* cited by examiner

*Primary Examiner*—Daniel Wu
*Assistant Examiner*—Fekadeselassie Girma
(74) *Attorney, Agent, or Firm*—Palomar Patent Calif Tervo

(57) ABSTRACT

A self-contained turn signal indicator unit for signaling to the hearing impaired driver of a motor vehicle that the vehicle's turn signals are activated. The indicator unit is attached to the cover of the vehicle's steering column and produces a loud audible signal and a light signal when the turn signal lever is moved to the turning position. The circuitry includes a battery, a turn switch activated by movement of the turn signal lever, and a buzzer and a lamp. A volume control, operable by a user, controls the volume of the sound. An optional timed switch for turning off the circuit has a normally closed position and has an open position for a predetermined period of time after the turn switch is closed and remains closed.

14 Claims, 1 Drawing Sheet

SELF-CONTAINED TURN SIGNAL INDICATOR UNIT

FIELD OF THE INVENTION

This invention relates in general to devices for indicating to the hearing impaired that a vehicle's turn signals are activated, and more specifically involves an indicator unit that is directly activated by the vehicle's turn signal lever.

BACKGROUND OF THE INVENTION

Automobile turn signal indicators use flashing lamps on the outside of the automobile to warn surrounding traffic of a prospective change in direction. To indicate a turn, the driver moves a lever that is mounted on the steering wheel shaft, which activates the respective turn signal indicator and causes the corresponding exterior lamps to blink. Conventional turn signal indicators also include lamps on the dash board that blink in synchronization with the blinking of the exterior lamps. Often, a "clicking" is additionally produced that is also synchronized with the blinking of the exterior lamps. The dash board lamps and clicking are meant to inform the driver that a particular turn signal indicator is activated. When the driver makes a sufficiently sharp turn, a mechanical control device automatically deactivates the turn signal indicator, and stops the blinking lamps and the clicking sound.

A problem with conventional turn signal indicators is that occasionally the driver will activate the turn signal, but not complete the turn for some reason. Alternatively, the driver may execute a turn that is not sufficient to automatically deactivate the indicator, as often occurs when changing lanes during highway driving. When this occurs, the driver must manually deactivate the turn signal indicator in order to stop it. If the turn signal indicator is not manually deactivated, then the driver travels down the road with a blinking turn signal, when no turning maneuver is immediately planned. This is not only annoying to other drivers, but can result in an accident by giving other motorists inaccurate information about the intentions of the driver.

As mentioned above, the dash board lamps and the clicking are supposed to notify the driver when a turn signal indicator is activated. The dash board lamps can be ineffective because sun may be shining on the panel or the driver's visual attention is focused on the road ahead, especially during highway driving. The clicking is difficult to hear for those drivers that are hearing impaired. Additionally, the clicking can be drowned out by traffic noise or the radio, even for those drivers with good hearing.

Therefore, what is needed is a way to improve the effectiveness of the turn signal indicator so that drivers, including hearing impaired drivers, will realize when a turn signal indicator is activated.

SUMMARY OF THE INVENTION

The invention is a self-contained turn signal indicator unit for signaling to the driver of a motor vehicle that the vehicle's turn signals are activated. The indicator unit produces a loud audible signal and a visible signal and is particularly useful for people with impaired hearing.

The indicator unit generally includes a housing for attachment to the cover of the vehicle's steering column adjacent the turn signal lever of the vehicle's turn signal system. Circuitry disposed in said housing generally includes a battery, a turn switch activated by movement of the turn signal lever; the switch having an open position when the lever is in the center position and a closed position when the lever is in the first or second positions; and a sound generator for generating a sound and a lamp for producing light visible by a user, both responsive to the turn switch being in the closed position. A volume control operable by a user controls the volume of the sound.

An optional timed switch has a normally closed position and has an open position for a predetermined period of time after the turn switch is closed and remains closed.

The turn switch includes an upper arm disposed above and adjacent the turn signal lever and a lower arm disposed below and adjacent the lever for contact by the lever upon its movement to activate the vehicle's turn signals.

Other features and many attendant advantages of the invention will become more apparent upon a reading of the following detailed description together with the drawings wherein like reference numerals refer to like parts throughout.

DETAILED DESCRIPTION OF THE INVENTION

Figure 1:
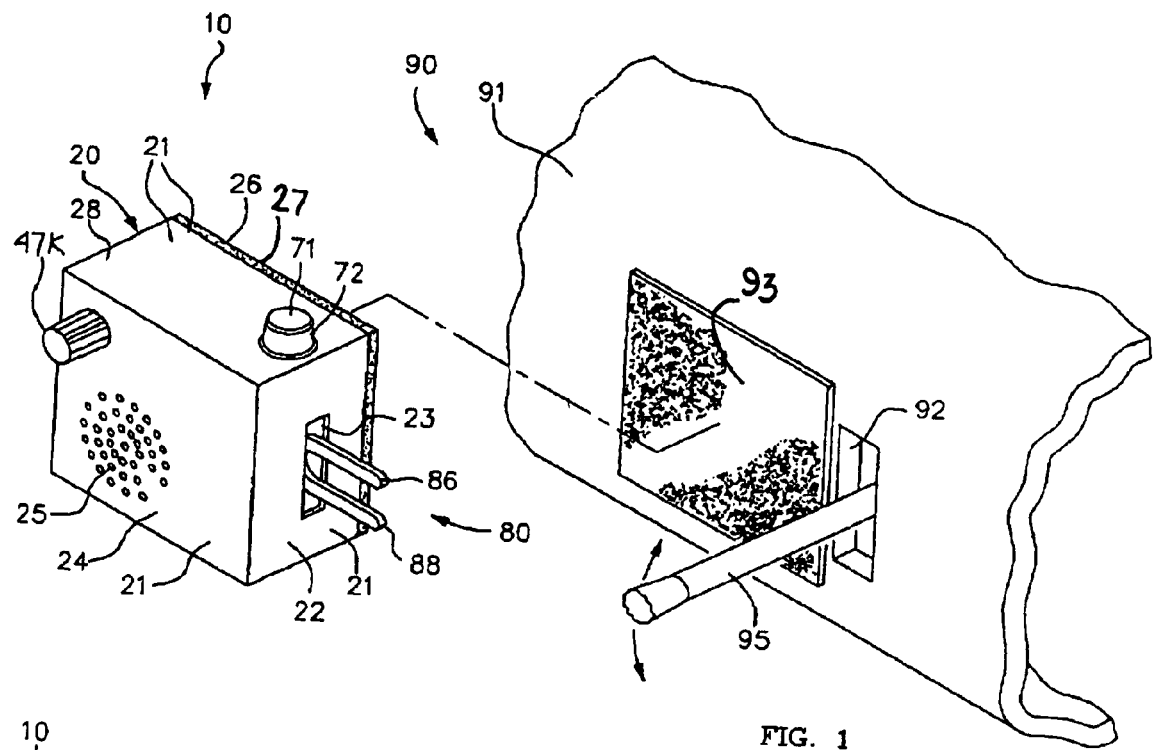
FIG. 1 is an exploded perspective view of an exemplary embodiment of the self-contained turn signal indicator unit of the invention as installed for use.

With reference now to the drawings, there is shown in FIG. 1 an exploded perspective view of an exemplary embodiment of the self-contained turn signal indicator unit 10 of the invention as installed for use on the cover 91 of a steering column 90 of a motor vehicle (not shown) having a turn signal system including a turn signal lever 95 extending from an opening 92 in cover 91 on steering column 90. Turn signal lever 95, shown, is representative of the type typically found in an automobile and is movable in a first direction from a center position for activating a left turn signal and movable in a second and opposite direction from the center position for activating a right turn signal.

Indicator unit 10 includes a housing 20 adapted for attachment to cover 91 of steering column 90. Housing 20 has outer walls 21 including a front wall 22, a left wall 24, a right wall 26, and a top wall 28. In the exemplary embodiment, housing 20 has hook/loop fastener material 27 on right wall 26 for attachment to mating hook/loop fastener material 93 attached to cover 91. The use of hook/loop fasteners 27, 93 allows unit 10 to be easily removed from cover 91 for use in another vehicle, for repair, or for replacing batteries. Of course, housing 20 may be attached to cover 91 in any desirable manner. For example, a belt, such as of elastic material could be used or two sided tape or even glue could be used instead of hook/loop fastener 27, 93.

As seen in FIG. 1, upper and lower arms 86, 88 of a circuit closer 80 protrude from an opening 23 in front wall 22 of housing 20 for disposition respectively above and below lever 95. A lamp 71, such as a light emitting diode (LED) 72, is located on top wall 28. Left wall 24 includes means, such as a plurality of bores 25 through left wall 24, for passage of sound through wall 24. A volume control knob 47K protrudes from housing 20 and is accessible to the user. Housing 20 includes means, not shown, for replacing batteries.

Figure 2:
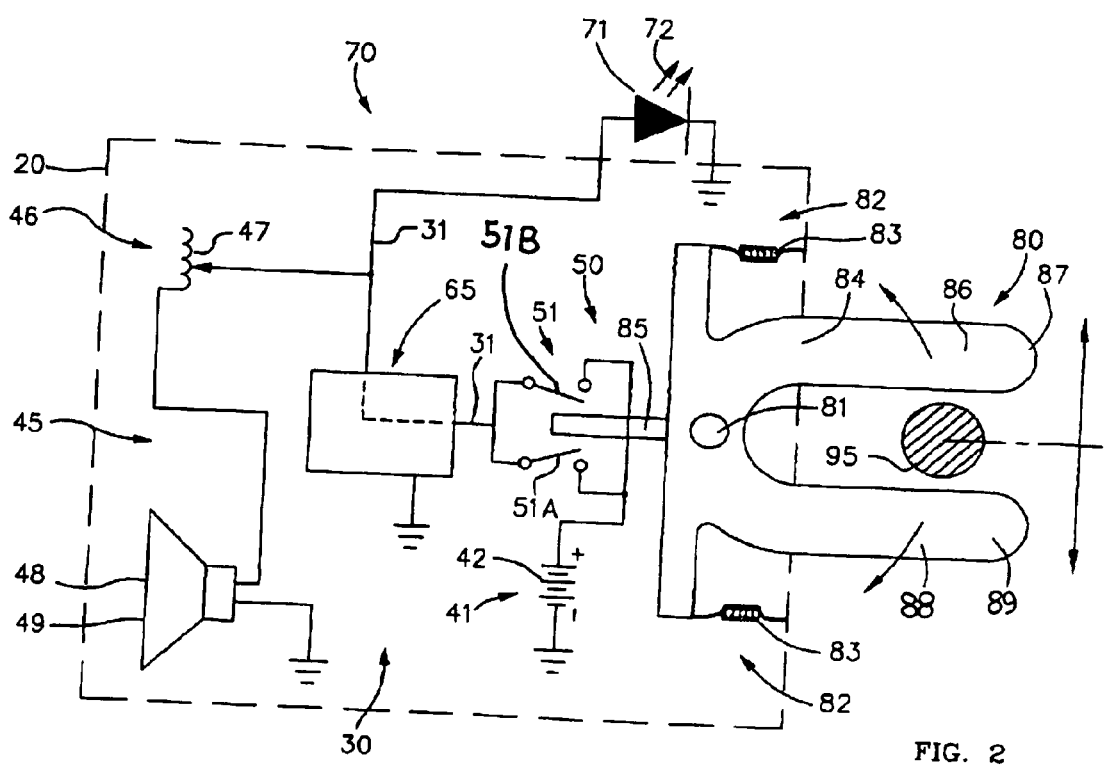
FIG. 2 is a diagrammatic view of the circuitry.

FIG. 2 is a diagrammatic view of the circuitry 30 disposed in housing 20 of indicator unit 10. Circuitry 30 generally includes a power source 41, a turn switch portion 50, a sound generating portion 45, a lamp portion 70 and an optional timed switch portion 65.

Power source 41 may be any suitable electrical source, such as a battery or batteries 42. Because unit 10 is designed to use very little power and it is desirable that unit 10 be of small size, a small battery 42 may be used. A rechargeable battery or conventional batteries, such as a plurality of AAA batteries or a nine volt battery could be used. Power source 41 includes suitable voltage limiters.

Turn switch portion 50 generally includes a pair of turn switches 51, such as first turn switch 51A and second turn switch 51B connected in parallel and electrically connected to battery 42. Turn switches 51 are mechanically activated by movement of a circuit closer 80. In the exemplary embodiment, circuit closer 80 generally includes a body 84 and biasing means 82 for biasing body 84 to a center position. Biasing means 82 includes a pair of tension springs 83 connected between housing 20 and body 84 for biasing body 84 about pivot pin 81 in the center position, shown.

Body 84 is pivotly attached, such as by pin 81, to housing 20 and generally includes a first arm or upper arm 86 having a proximal end and having a distal end 87 disposed adjacent lever 95 in the first direction, a second arm or lower arm 88 having a proximal end and a distal end 89 disposed adjacent lever 95 in the second direction, and closing finger 85.

Switch 51 is in the open position when lever 95 is in the center position and body 84 is in the center position. If lever 95 is moved upward in the first direction, it pushes upper arm 86 of body 84 upward, thereby pivoting body 84 about pin 81 such that finger 85 closes first switch 51A. If lever 95 is moved downward in the second direction, it pushes lower arm 88 of body 84 downward, thereby pivoting body 84 about pin 81 such that finger 85 closes second switch 51B. Either switch 51A or 51B remains closed so long as lever 95 remains in the up or down (i.e. first or second) position.

Closed turn switch 51 provides power to line 31. An optional timed switch portion 65, as described further herein, may be imposed in line 31.

Sound generating portion 45 receives power from turn switch 51. Sound generating portion 45 includes a sound generator 48 and a volume control 46. Sound generator 48 may be anything that generates a sound, such as a buzzer 49 or a tone generator, or the like. Output of a click or beep at a rate of about ninety per second may be used. Volume control 46 controls the volume of the sound generated by sound generator 48 and may be any suitable control, such as potentiometer 47, that receives power from turn switch 51 on line 31 and supplies the power to the sound generator 48. Preferably, the volume is controllable over a range from null, i.e. completely off, to sufficiently loud to be heard over fairly loud road noise or background conversation.

Lamp portion 70 includes lamp 71, such as LED 72. LED 72 receives power from turn switch 51 on line 31 and produces light visible by a user so as to provide a secondary indication that the vehicle's turn signals are activated.

An optional timed switch 65 may be imposed in power line 31 to turn off circuit 30 after a time. Timed switch 65 has a normally closed position completing line 31 and has an open position for a predetermined period of time after turn switch 51 is closed and remains closed. The predetermined period of time may be, for example five minutes. Timed switch 65 will reset, i.e. close, when power is removed from line 31. Timed switch 65 may be an integrated circuit. Timed switch 65 will save power and turn off buzzer 49 and light 71 should lever 95 be left on, for example if the vehicle is parked.

From the foregoing description, it is seen that the present invention provides an extremely simple, efficient, and reliable device for informing the hearing impaired that their turn signals are activated.

Having described the preferred embodiments of the present invention, many alterations and modifications which are within the inventive concepts disclosed herein will likely occur to those skilled in the art. For example, circuit closer 80 may include two completely separate arms 86, 88 that are individually pivotable. Or turn switches 51 may be located on distal ends 87, 89 of arms 86, 88 for direct contact and closing by lever 95. It is also possible, to design turn switch 51 to be a single switch. A dimmer control could be used in lamp portion 70.

Although a particular embodiment of the invention has been illustrated and described, various changes may be made in the form, composition, construction, and arrangement of the parts herein without sacrificing any of its advantages. Therefore, it is to be understood that all matter herein is to be interpreted as illustrative and not in any limiting sense, and it is intended to cover in the appended claims such modifications as come within the true spirit and scope of the invention.

I claim:

1. A self-contained turn signal indicator unit for use in a motor vehicle having a turn signal system including a turn signal lever extending from a cover on a steering column; the lever movable in a first direction from a center position for activating a left turn signal and movable in a second and opposite direction from the center position for activating a right turn signal; the unit comprising:
   a housing for attachment to the cover of the steering column;
   circuitry attached to said housing including:
      a switch activated by movement of the turn signal lever; the switch having an open position when the lever is in the center position and a closed position when the lever is in the first or second position;
      a power source; and
      a sound generator for generating a sound responsive to said switch being in the closed position.

2. The turn signal indicator unit of claim 1 wherein:
   said circuitry further includes:
      a volume control for controlling the volume of the sound generated by said sound generator.

3. The turn signal indicator unit of claim 1 wherein:
   said circuitry further includes:
      a lamp for producing light visible by a user responsive to said switch being in the closed position.

4. The turn signal indicator unit of claim 3 wherein:
   said circuitry further includes:
      a volume control operable by a user for controlling the volume of the sound generated by said sound generator.

5. The turn signal indicator unit of claim 1 wherein:
   said switch includes:
      a circuit closer including:
         a first arm having a proximal end connected to said frame; and a distal end disposed adjacent the lever in the first direction; and
         a second arm having a proximal end connected to said frame and a distal end disposed adjacent the lever in the second direction.

6. The turn signal indicator unit of claim 1 wherein:
   said switch includes:
      a mechanical circuit closer pivotly attached to said frame including:
         a first arm having a distal end disposed adjacent the lever in the first direction; and
         a second arm having a distal end disposed adjacent the lever in the second direction.

7. The turn signal indicator unit of claim 1 further including:
   means for attaching said housing to the cover of the steering column.

8. A self-contained turn signal indicator unit for use in a motor vehicle having a turn signal system including a turn signal lever extending from a cover on a steering column; the lever movable in a first direction from a center position for activating a left turn signal and movable in a second and opposite direction from the center position for activating a right turn signal; the unit comprising:

a housing for attachment to the cover of the steering column;

circuitry disposed in said housing including:

a turn switch activated by movement of the turn signal lever; the switch having an open position when the lever is in the center position and a closed position when the lever is in the first or second positions;

a power source;

a timed switch having a normally closed position and having an open position a predetermined period of time after said turn switch is closed and remains closed; and a sound generator for generating a sound responsive to said turn switch and said timed switch being in the closed positions.

9. The turn signal indicator unit of claim 8 wherein:
said circuitry further includes:
a volume control for controlling the volume of the sound generated by said sound generator.

10. The turn signal indicator unit of claim 8 wherein:
said circuitry further includes:
a lamp for producing light visible by a user responsive to said switch being in the closed position.

11. The turn signal indicator unit of claim 10 wherein:
said circuitry further includes:
a volume control operable by a user for controlling the volume of the sound generated by said sound generator.

12. The turn signal indicator unit of claim 8 wherein:
said switch includes:
a circuit closer including:
a first arm having a proximal end connected to said frame; and a distal end disposed adjacent the lever in the first direction; and
a second arm having a proximal end connected to said frame and a distal end disposed adjacent the lever in the second direction.

13. The turn signal indicator unit of claim 8 wherein:
said switch includes:
a mechanical circuit closer pivotly attached to said frame including:
a first arm having a distal end disposed adjacent the lever in the first direction; and
a second arm having a distal end disposed adjacent the lever in the second direction.

14. The turn signal indicator unit of claim 8 further including:
means for attaching said housing to the cover of the steering column.

* * * * *